US012659872B2

(12) United States Patent
Lee et al.

(10) Patent No.: US 12,659,872 B2
(45) Date of Patent: Jun. 16, 2026

(54) METHOD AND DEVICE FOR SUPPORTING MULTIPLE UPLINK CARRIER ACCESS IN WIRELESS COMMUNICATION SYSTEM

(71) Applicant: Samsung Electronics Co., Ltd., Gyeonggi-do (KR)

(72) Inventors: Changsung Lee, Gyeonggi-do (KR); Suhwook Kim, Gyeonggi-do (KR); Sooeun Song, Gyeonggi-do (KR); Jaehong Yi, Gyeonggi-do (KR); Hyeondeok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 374 days.

(21) Appl. No.: 18/094,653

(22) Filed: Jan. 9, 2023

(65) Prior Publication Data
US 2024/0196337 A1     Jun. 13, 2024

(30) Foreign Application Priority Data
Dec. 9, 2022     (KR) ........................ 10-2022-0171291

(51) Int. Cl.
| | |
|---|---|
| *H04W 52/24* | (2009.01) |
| *H04W 24/02* | (2009.01) |
| *H04W 52/14* | (2009.01) |
| *H04W 74/04* | (2009.01) |

(52) U.S. Cl.
CPC ......... *H04W 52/242* (2013.01); *H04W 24/02* (2013.01); *H04W 52/146* (2013.01); *H04W 74/04* (2013.01)

(58) Field of Classification Search
CPC . H04W 52/242; H04W 24/02; H04W 52/146; H04W 74/04
See application file for complete search history.

(56) References Cited

U.S. PATENT DOCUMENTS

| | | |
|---|---|---|
| 2019/0053080 A1 | 2/2019 | Ryu et al. |
| 2021/0195552 A1 | 6/2021 | Srinivasan et al. |
| 2022/0116161 A1 | 4/2022 | Jones et al. |
| 2022/0124634 A1 | 4/2022 | Bai et al. |

(Continued)

FOREIGN PATENT DOCUMENTS

| | | | |
|---|---|---|---|
| EP | 3 687 210 | 7/2020 | |
| EP | 3687210 A1 * | 7/2020 | ............ H04W 16/00 |

(Continued)

OTHER PUBLICATIONS

Qualcomm Incorporated, Discussion on AI/ML Methods, R2-2212659, 3GPP TSG-RAN WG2 Meeting #120, Nov. 14-18, 2022, 13 pages.

(Continued)

*Primary Examiner* — John J Lee

(74) *Attorney, Agent, or Firm* — The Farrell Law Firm, P.C.

(57) ABSTRACT
The present disclosure relates to a 5G communication system or a 6G communication system for supporting higher data rates beyond a 4G communication system such as long term evolution (LTE). A method and an apparatus are provided in a wireless communication system, in which, artificial intelligence (AI) model setup information for estimating AI-based uplink (UL) pathloss is received from a base station. The AI-based UL pathloss for an UL carrier is estimated based on the AI model setup information.

16 Claims, 14 Drawing Sheets

(56)          References Cited

U.S. PATENT DOCUMENTS

| 2022/0183012 | A1  | 6/2022  | Shahid et al. | |
|---|---|---|---|---|
| 2022/0217645 | A1  | 7/2022  | Gupta et al. | |
| 2022/0361086 | A1* | 11/2022 | Wang ................... | H04W 40/12 |
| 2023/0199669 | A1* | 6/2023  | Vannithamby ........ | H04W 52/06 |
| | | | | 455/127.1 |

FOREIGN PATENT DOCUMENTS

| KR | 10-20190017136 | 2/2019 |
|---|---|---|
| KR | 1020200082460 | 7/2020 |
| KR | 1020200087326 | 7/2020 |
| WO | WO 2022/013104 | 1/2022 |
| WO | WO 2022/133863 | 6/2022 |

OTHER PUBLICATIONS

International Search Report dated Aug. 22, 2023 issued in counterpart application No. PCT/KR2022/020007, 10 pages.
European Search Report dated Nov. 24, 2025 issued in counterpart application No. 22967947.7-1206, 9 pages.

* cited by examiner

[UL Addition scenario]

DL : 28 GHz (TDD)
UL : 28 GHz (TDD), 2.1 GHz (FDD), 800 MHz (FDD)

[UL Release scenario]

DL : 28 GHz (TDD)
UL : 28 GHz (TDD), 2.1 GHz (FDD), 800 MHz (FDD)

METHOD AND DEVICE FOR SUPPORTING MULTIPLE UPLINK CARRIER ACCESS IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0171291, which was filed in the Korean Intellectual Property Office on Dec. 9, 2022, the entire disclosure of which is incorporated herein by reference.

BACKGROUND

1. Field

The disclosure relates generally to a wireless communication system, and more particularly, to a method and device for supporting multiple uplink carrier access and uplink transmission power control in a wireless communication system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 µsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

The disclosure provides a method and device for supporting AI-based multiple uplink carrier access and uplink transmission power control in a wireless communication system.

According to an embodiment of the disclosure, a method by a UE in a wireless communication system is provided. The UE receives, from a base station, AI model setup information for estimating AI-based UL pathloss. The UE estimates the AI-based UL pathloss for a base UL carrier based on the AI model setup information.

According to an embodiment of the disclosure, a UE for use in a wireless communication system is provided. The UE includes a memory and a processor connected to the memory. The processor may be configured to receive, from a base station, artificial intelligence AI model setup information for estimating AI-based UL pathloss, and estimate the AI-based UL pathloss for a base UL carrier based on the AI model setup information.

BRIEF DESCRIPTION OF THE DRAWINGS

The above and other aspects, features, and advantages of the disclosure will be more apparent from the following detailed description when taken in conjunctions with the accompanying drawings, in which.

DETAILED DESCRIPTION

Figure 1:
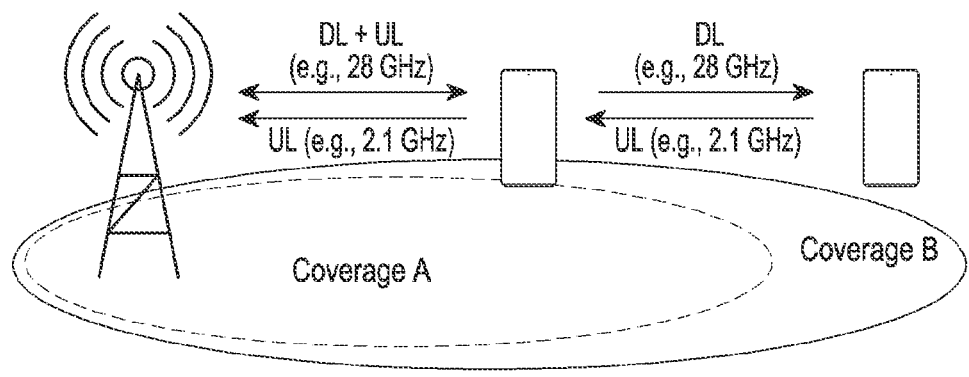
FIG. 1 is a diagram illustrating a method for uplink (UL) enhancement, according to an embodiment.

Embodiments of the disclosure are described in detail with reference to the accompanying drawings. The same or similar components may be designated by similar reference numerals although they are illustrated in different drawings. Detailed descriptions of constructions or processes known in the art may be omitted to avoid obscuring the subject matter of the disclosure.

Some elements may be exaggerated or schematically shown. The size of each element does not necessarily reflect the real size of the element.

Advantages and features of the disclosure and methods for achieving the same may be understood through the embodiments to be described below taken in conjunction with the accompanying drawings. However, the disclosure is not limited to the embodiments herein, and various changes may be made thereto. The embodiments herein are provided only to inform one of ordinary skilled in the art. The disclosure is defined only by the appended claims. The terms used herein are defined considering the functions in the disclosure and may be replaced with other terms according to the intention or practice of the user or operator. Therefore, the terms should be defined based on the overall disclosure.

The blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" refers to a software element or a hardware element such as a field-programmable gate array (FPGA) or an application specific integrated circuit (ASIC). A unit plays a certain role. However, the term "unit" is not limited to a software or hardware element. A unit may be configured in a storage medium that may be addressed or may be configured to reproduce one or more processors. Accordingly, as an example, a unit includes elements, such as software elements, object-oriented software elements, class elements, task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more CPUs in a device or a security multimedia card. According to embodiments, a unit may include one or more processors.

As used herein, each of the phrases as "A or B", "at least one of A and B", "at least one of A or B", "A, B, or C", "at least one of A, B, and C", and "at least one of A, B, or C," may include all possible combinations of the items enumerated together in a corresponding one of the phrases. As used herein, such terms as "1st" and "2nd", or "first" and "second" may be used to simply distinguish a corresponding component from another, and does not limit the components in another aspect (e.g., importance or order).

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of such a broadband wireless communication system, the LTE system adopts orthogonal frequency division multiplexing (OFDM) for downlink and single carrier frequency division multiple access (SC-FDMA) for uplink. Uplink refers to a wireless link in which the user equipment (UE) (or mobile station (MS)) transmits data or control signals to the base station (BS) (or eNode B). Downlink refers to a wireless link in which the base station transmits data or control signals to the UE. Such a multiple access scheme may typically allocate and operate time-frequency resources carrying data or control information per user not to overlap (i.e., to maintain orthogonality, and to differentiate each user's data or control information).

The BS may be an entity allocating a resource to a terminal and may be at least one of a gNode B (gNB), an eNode B (eNB), a Node B, a radio access unit, a base station controller, or a node over network. The BS may be a network entity including at least one of an integrated access and backhaul-donor (IAB-donor), which is a gNB providing network access to UE(s) through a network of backhaul and access links in the new radio (NR) system, and an IAB-node, which is a radio access network (RAN) node supporting NR backhaul links to the IAB-donor or another IAB-node and supporting NR access link(s) to UE(s). The UE may be at least one of a terminal, an MS, a cellular phone, a smartphone, a computer, or a multimedia system capable of performing communication functions. The UE is wirelessly connected through the IAB-node and may transmit/receive data to and from the IAB-donor connected with at least one IAB-node through the backhaul link.

For ease of description, some of the terms or names defined in the 3GPP standards (standards for 5G, NR, LTE, or similar systems) may be used. However, the disclosure is not limited by such terms and names and may be likewise applicable to systems conforming to other standards. Further, the disclosure is not limited to the terms used in the following embodiments, and the terms may be replaced with other terms denoting objects with equivalent technical meanings.

FIG. 1 is a diagram illustrating a method for UL enhancement, according to an embodiment.

In general, the UL has narrower coverage than the DL due to power limitations of the UE. This may act as a bottleneck in overall system coverage. In particular, in the case of the 'above 6 GHz' band (e.g., mmWave band/high band (24-92 GHz)/upper-mid band (7-24 GHz)), the coverage mismatch between these DL/UL may worsen.

To address the coverage mismatch, supplementary UL (SUL) technology may be used to secure UL coverage by additionally using a lower frequency band in UL than in DL.

For enhancement of UL capacity, a UL transmission (Tx) switching technology may be used together with the SUL technology. For example, as shown in FIG. 1, UL Tx switching for SUL may be applied. Referring to FIG. 1, not only the high band (e.g., 28 GHz band), but also the low/mid band (e.g., 2.1 GHz band) for SUL may be switched and used for UL transmission within coverage A. As shown in FIG. 1, UL Tx switching may be applied between two bands, but is not limited thereto. For example, UL Tx switching is applicable even between up to 3 or 4 bands.

A technique for UL enhancement, such as, for example, SUL/UL Tx switching, may use a plurality of UL carriers for UL transmission. Therefore, it is necessary to consider a method for selecting and accessing an appropriate UL carrier among a plurality of UL carriers. Further, a method for determining suitable UL power for UL transmission through the selected UL carrier may be considered.

An example of a scheme for UL carrier selection and UL transmission power determination may be a scheme based on measurement of a DL signal (DL measurement).

For example, UL coverage or UL carrier-based selection may be determined based on a comparison between DL reference signal received power (RSRP) measurement data and a preset threshold (e.g., rsrp-ThresholdSSB-SUL). The DL RSRP measurement data may be data (DL synchronization signal (SS)-RSRP measurement data) measured based on the DL synchronization signal block (SSB) (or a reference signal in the SSB), or data measured based on another reference signal (e.g., a channel state information reference signal (CSI-RS)).

For example, UL transmit power may be determined using the pathloss estimated based on the DL SSB or another reference signal (e.g., CSI-RS). Such pathloss estimation may use a known pathloss estimation method.

Equation (1) represents an example of a method for calculating physical random access channel (PRACH) transmission power based on pathloss.

$$P_{PRACH,b,f,c}(i)=\min\{P_{CMAX,f,c}(i),P_{PRACH,target,f,c}+PL_{b,f,c}\} \tag{1}$$

Here, $P_{PRACH,b,f,c}(i)$ denotes the transmission power of the PRACH transmitted on the active UL bandwidth part (BWP) b of the carrier f of the serving cell c in the transmission occasion i. $P_{CMAX,f,c}(i)$ denotes the UE configured maximum output power for the carrier f of the serving cell $c^c$ in the transmission occasion i. $P_{PRACH,target,f,c}$ denotes the PRACH target reception power (PREAMBLE_RECEIVED_TARGET_POWER) provided by higher layers for the active UL BWP b of the carrier f of the serving cell c. $PL_{b,f,c}$ denotes the pathloss estimation for the active UL BWP b of the carrier f based on the DL RS associated with PRACH transmission for the active UL BWP b of the serving cell c.

Equation (2) below represents an example of a method for calculating physical uplink shared channel (PUSCH) transmission power based on pathloss.

$$P_{PUSCH,b,f,c}(i, j, q_d, l) = \tag{2}$$
$$\min\left\{\begin{array}{l} P_{CMAX,f,c}(i), \\ P_{O-PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array}\right\}$$

Here, $P_{PUSCH,b,f,c}(i,j,q_d,l)$ denotes the transmission power in the PUSCH transmission occasion i of the PUSCH, transmitted on the active UL BWP b of the carrier f of the serving cell c using the parameter set configuration having index j and the PUSCH power control adjustment state having index l. $P_{CMAX,f,c}(i)$ denotes the UE-configured maximum output power for the carrier f of the serving cell c in the PUSCH transmission occasion i. $P_{O-PUSCH,b,f,c}(j)$ denotes the parameter constituted of the sum of component $P_{O-NOMINAL,PUSCH,f,c}(j)$ and component $P_{O-UE-PUSCH,b,f,c}(j)$.

$$M_{RB,b,f,c}^{PUSCH}(i)$$

the bandwidth of the PUSCH resource allocation represented as the number of resource blocks for the PUSCH transmission occasion i on the active UL BWP b of the carrier f of the serving cell c. $PL_{b,f,c}(q_d)$ denotes the DL pathloss estimation in dB calculated by the UE using the reference signal index $q_d$ for the active UL BWP b of the carrier f of the serving cell c. $f_{b,f,c}(i,l)$ denotes the PUSCH power control adjustment state l for the active UL BWP b of the carrier f of the serving cell c and the PUSCH transmission occasion i.

However, when the DL band and the UL band are different, the accuracy of pathloss estimation and the accuracy of UL carrier selection (or UL coverage) may deteriorate. Therefore, it is necessary to consider a method for increasing the accuracy of pathloss estimation and UL carrier selection.

Figure 2:
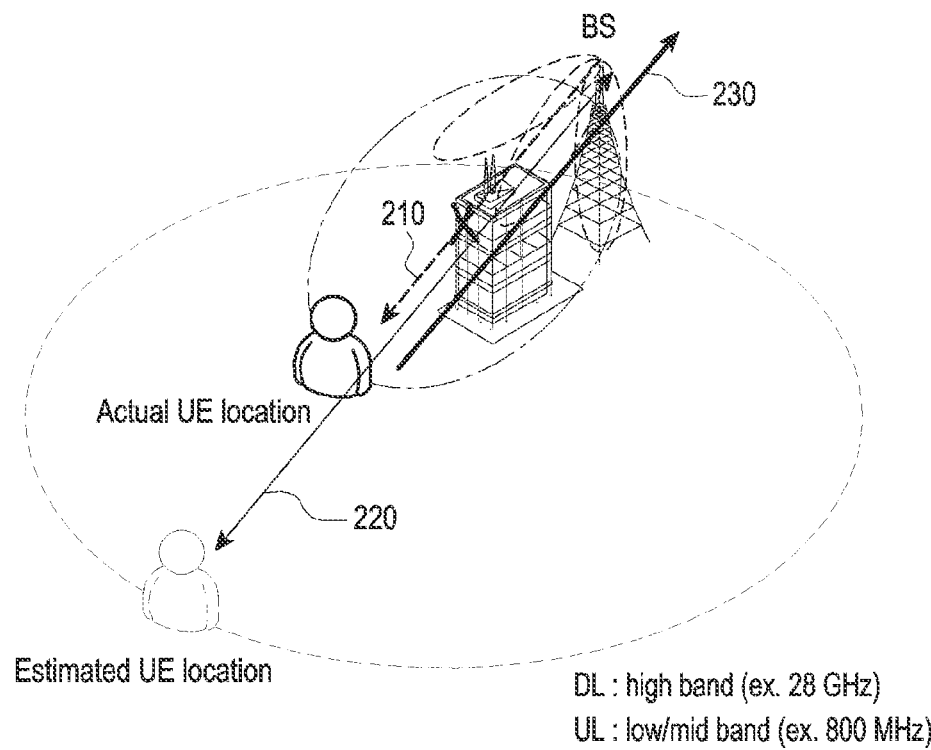
FIG. 2 is a diagram illustrating a scenario for determining UL coverage and UL power using downlink (DL) measurement, according to an embodiment.

FIG. 2 is a diagram illustrating a scenario for determining UL coverage and UL power using downlink (DL) measurement, according to an embodiment.

In FIG. 2, it is assumed that the DL band and the UL band are different and that the UL band uses a lower frequency band than the DL band. For example, as shown in FIG. 2, the UL band may use a low/mid band (e.g., 800 MHz), and the DL band may use a high band (e.g., 28 GHz).

Referring to FIG. 2, the UE may perform DL measurement.

The UE may measure DL RSRP (e.g., DL SS-RSRP). In this case, as shown in 210 of FIG. 2, when there is a blockage between the UE and the BS, inaccurate DL RSRP may be measured due to blocking of the reception signal by the blockage. As described above, DL RSRP measurement data may be used for UL coverage determination or UL carrier selection. For example, an appropriate UL carrier may be selected from among the SUL carrier and the normal UL (NUL) carrier based on a comparison between the DL SS-RSRP and a preset threshold (e.g., rsrp-ThresholdSSB-SUL).

Therefore, inaccurate DL SS-RSRP measurement may cause inaccurate UL coverage determination (or UL carrier selection). For example, in 220 of FIG. 2, the UE may be estimated to be positioned farther from the base station than the actual location of the UE, and it may be determined that greater UL coverage is required.

The UE may estimate the pathloss based on the DL SSB (or another reference signal (e.g., CSI-RS)). In this case, as shown in FIG. 2, when there is a blockage between the UE and the base station, an inaccurate pathloss value may be estimated. Inaccurate path loss estimation may result in incorrect UL power allocation. For example, in 230 of FIG. 2, the UE is allocated higher UL power because the UE is estimated to be positioned in a farther location than the actual location of the UE due to inaccurate pathloss estimation.

As such, as shown in FIG. 2, when the DL band and the UL band are different, inaccurate pathloss estimation and inappropriate UL carrier selection may be made. This may be an issue that arises as channel reciprocity is not established because a DL signal using a high band is vulnerable to blockage whereas a UL signal using a low/mid band is relatively robust to blockage.

Inaccurate UL transmission power allocation due to inaccurate pathloss estimation may cause unnecessary power consumption of the UE and aggravate UL interference. Further, inappropriate UL carrier selection due to inaccurate DL measurement may reduce the efficiency of resource use.

Therefore, when a plurality of UL carriers are used for UL enhancement, a method for obtaining accurate pathloss and accurate UL coverage (or UL carrier) needs to be considered.

The disclosure provides a method for obtaining UL pathloss data using a trained AI model, selecting/accessing an appropriate UL carrier from among a plurality of UL carriers using the obtained UL pathloss data, and efficiently controlling UL transmission power.

Figure 3:
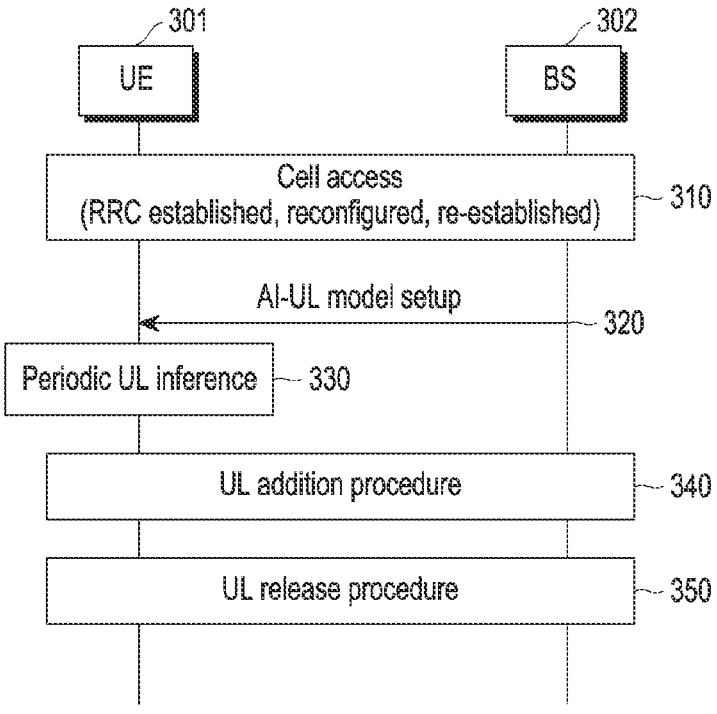
FIG. 3 is a diagram illustrating a method for multiple UL carrier access, according to an embodiment.

FIG. 3 is a diagram illustrating a method for multiple UL carrier access, according to an embodiment.

A method for multiple UL carrier access may be a method using AI. For example, a method for multiple UL carrier access may be a method using UL pathloss data obtained using a pre-trained AI model. The AI model may be a deep learning-based model (e.g., a deep neural network (DNN), a recurrent neural network (RNN), a convolutional neural network (CNN)) and/or a machine learning-based model (e.g., support vector machine (SVM) or gradient boosting machine (GBM)).

Referring to FIG. 3, at 310, a UE 301 and a BS 302 may perform a cell access procedure. The cell access procedure may include a radio resource control (RRC) established procedure, an RRC reconfigured procedure, and/or an RRC re-established procedure. Thus, an RRC connection may be established between the UE 301 and the BS302.

At 320, the BS 302 may transmit AI model setup information to the UE 301. The AI model setup information may be referred to as AI UL inference setup information.

The AI model setup information may include at least one of AI model parameters, inference interval/period parameters, UL carrier offset parameters, UL addition event parameters, UL release event parameters, or RACH indicator parameters. A description of each parameter is set forth below.

AI model: The AI model parameter may be a parameter defining an AI model. The AI model may be an AI model having the pathloss $\hat{PL}_b(x; \theta)$ of the base UL carrier as the output. The base UL carrier may be, for example, a UL carrier having the widest UL coverage among available UL carriers, but is not limited thereto. The AI model parameter may include hyperparameters for the AI model, such as, for example, the number of layers (#layers), the number of nodes (#nodes), an input/output format, and/or an activation function. The AI model parameter may be referred to as $\theta$.

Inference interval: The inference interval parameter may designate the period (UL inference period)/interval for performing UL inference using the AI model. Through UL inference using the AI model, pathloss data of the base UL carrier may be obtained periodically.

UL carrier offset: The UL carrier offset parameter may designate the offset $\Delta$ between the pathloss $\hat{PL}_b(x; \theta)$ of the base UL carrier and the pathloss $\hat{PL}_i$ of another UL carrier (e.g., the UL carrier having index i). The UL carrier offset parameter may be set for each UL carrier.

The relationship between the pathloss $\hat{PL}_b(x; \theta)$ and the pathloss $\hat{PL}_i$ may be as shown in Equation (3) below.

$$\hat{PL}_i = \hat{PL}_b(x;\theta) + \Delta_i \qquad (3)$$

Here, x is the input (e.g., the DL RSRP measurement data (e.g., DL SS-RSRP) or UE location data (e.g., GPS data) or a combination of the DL RSRP measurement data and the UE location data) of the AI model, and $\theta$ is the AI model parameter. The pathloss $\widehat{PL}_i$ of the UL carrier having index i corresponds to the sum of the AI model input x and the pathloss $\widehat{PL}_b(x; \theta)$ of the base UL carrier for the AI model parameter $\theta$, and the UL carrier offset $\Delta_i$ for the UL carrier having index i.

UL addition event: The UL addition event parameter may include information about an event for adding a new UL carrier. The event for adding a new UL carrier may be referred to as event U1, addition event or UL addition event. The condition for event U1 (UL addition condition) may be as shown in Equation (4) below.

$$\widehat{PL}_i < \text{Thresh}_{U1} \tag{4}$$

Here, $\text{Thresh}_{U1}$ may be a threshold for event U1. According to Equation (4), when the pathloss $\widehat{PL}_i$ of the UL carrier (e.g., the UL carrier having index i) is smaller than $\text{Thresh}_{U1}$, event U1 may be determined to meet the condition (UL addition condition).

The UL addition event parameter may include $\text{Thresh}_{U1}$.

UL release event: The UL release event parameter may include information about an event for releasing an existing UL carrier (event U2/release event). The event for releasing the UL carrier may be referred to as event U2, release event or UL release event. The condition for event U2 (UL release condition) may be as shown in Equation (5) below.

$$\widehat{PL}_i > \text{Thresh}_{U2} \tag{5}$$

Here, $\text{Thresh}_{U2}$ may be a threshold for event U2. According to Equation (5), when the pathloss $\widehat{PL}_i$ of the UL carrier (e.g., the UL carrier having index i) is larger than $\text{Thresh}_{U2}$, event U2 may be determined to meet the condition (UL release condition).

The UL release event parameter may include $\text{Thresh}_{U2}$.

RACH indicator: The RACH indicator parameter may be an indicator indicating whether operation is performed as contention free random access (CFRA) or RACH-less. For example, the RACH indicator parameter may be a Boolean indicator set to one of a first value (e.g., 1) indicating operation as CFRA or a second value (e.g., 0) indicating operation as RACH-less.

The AI model setup information may be transmitted through an RRC message.

Table 1 shows an example of an RRC message including AI model setup information.

TABLE 1

| RRCReconfiguration-IEs := | SEQUENCE { | |
|---|---|---|
| ... | | |
| measConfig | MeasConfig | OPTIONAL, -- Need M |
| ... | | |
| ai-ul-inferConfig | AI-UL-InferConfig | OPTIONAL, -- NEED M |
| } | | |

Referring to Table 1, AI model setup information (e.g., ai-ul-InferConfig) may be included in an RRC message or the RRCReconfiguration information element (IE) in the RRC message. The ai-ul-InferConfig information included in the RRC message may be an example of the above-described AI model setup information.

Table 2 illustrates an example of parameters included in the AI model setup information (e.g., ai-ul-InferConfig).

TABLE 2

| AI-UL-InferConfig ::= | SEQUENCE { | |
|---|---|---|
| ai-ul-ModelConfig | AI-UL-ModelConfig | OPTIONAL, -- Need N |
| InferIdToAddModList | InferIdToAddRodList | OPTIONAL, -- Need N |
| InferIdToRemoveList | InferIdToAddModList | OPTIONAL, -- Need N |
| ulAddReqConfig | UlAddReqConfig | OPTIONAL, -- Need N |
| ulRelReqConfig | UlRelReqConfig | OPTIONAL, -- Need N |
| } | | |
| AI-UL-ModelConfig ::= | SEQUENCE { | |
| modelId | ModelId, | |
| baseUL | ULCarrierIndex | |
| InferInterval | ENUMERATED {ms40, ms80, ...} | |
| } | | |
| InferIdToRemoveList ::= | SEQUENCE (SIZE (1..maxInferId) OF InferId | |
| InferIdToAddModList ::= | SEQUENCE (SIZE (1..maxInferId) OF InferIdToAddMod | |
| InferIdToAddMod ::= | SEQUENCE { | |
| InferId | InferId, | |
| InferObject | ULCarrierIndex, | |
| InferOffset | INTEGER ( ) | |
| } | | |

Referring to Table 2, the AI model setup information may include AI UL model setup parameters (e.g., ai-ul-Model-Config), inference ID addition/modification list parameters (e.g., inferIDToAddModlist), inference ID removal list parameters (e.g., inferIDRemovelist), UL addition request setup parameters (e.g., ulAddReqConfig) and/or UL release request setup parameters (e.g., ulRelReqConfig).

The AI UL model setup parameters (e.g., ai-ul-Model-Config) may include a model ID parameter (modelId) indicating the AI model ID (ModelId), a base UL parameter (baseUL) designating the base UL carrier, and/or an infer interval parameter (inferInterval) indicating the infer interval. The base UL parameter (baseUL) may include the index of the UL carrier used as the base UL carrier.

The inference ID addition/modification list parameters (e.g., inferIDToAddModlist) may include the sequence of the inference ID addition/modification parameter (e.g., inferIDToAddMod). The inference ID addition/modification parameters (e.g., inferIDToAddMod) may include an interference ID parameter (inferID) designating the interference ID, an interference object parameter (inferObject) indicating the index of the UL carrier associated with the interference ID, and/or an interference offset parameter (inferOffset) designating the infer offset. The inference ID may be used as an index to distinguish various pieces of inference configuration information.

The inference ID removal list (e.g., inferIDRemovelist) may be a sequence of inference ID parameters (InferId) to be removed.

Table 3 shows an example of a UL addition request configuration parameter (e.g., ulAddReqConfig) and a UL release request configuration parameter (e.g., ulRelReqConfig).

TABLE 3

| UlAddReqConfig ::= | SEQUENCE { |
| --- | --- |
| eventId | CHOICE { |
| eventU1 | SEQUENCE { |
| u1-Threshold | InferredPathloss-Range, |
| hysteresis | Hysteresis, |
| timeToTrigger | TimeToTrigger |
| }, | |
| rachIndicator | BOOLEAN |
| .... | |
| } | |
| } | |
| UlRelReqConfig ::= | SEQUENCE { |
| eventId | CHOICE { |
| eventU2 | SEQUENCE { |
| u2-Threshold | InferredPathloss-Range, |
| hysteresis | Hysteresis, |
| timeToTrigger | TimeToTrigger |
| }, | |
| .... | |
| } | |
| } | |

Referring to Table 3, the UL addition request configuration parameter (e.g., ulAddReqConfig) may include parameters for the UL carrier addition event (eventU1).

The UL addition request configuration parameter (e.g., ulAddReqConfig) may include a u1-Threshold parameter, a Hysteresis parameter, and/or a timeToTrigger parameter.

The u1-Threshold parameter may designate a threshold for an estimated pathloss for triggering eventU1.

The Hysteresis parameter is a parameter used for the entering condition and leaving condition of eventU1. The Hysteresis parameter in the UL addition request configuration parameter may be referred to as a first Hysteresis parameter. The entering condition of eventU1 may be referred to as a UL addition event entering condition, and the leaving condition of eventU1 may be referred to as a UL addition event leaving condition.

The timeToTrigger (TTT) parameter may designate a time (period) that should be met for eventU1 to be triggered. The TTT parameter in the UL addition request configuration parameter may be referred to as a second TTT parameter.

The entering condition of eventU1 (the UL addition event entering condition) may be as shown in Equation (6) below.

$$PL+Hysteresis<Threshold_1 \qquad (6)$$

Here, PL denotes the estimated pathloss (e.g., $\hat{PL}_i$). Hysteresis denotes the value designated by the Hysteresis parameter (first Hysteresis parameter). $Threshold_1$ denotes the value designated by the u1-Threshold parameter.

The leaving condition of eventU1 may be as shown in Equation (7) below.

$$PL-Hysteresis>Threshold_1 \qquad (7)$$

Here, PL denotes the estimated pathloss (e.g., $\hat{PL}_i$). The Hysteresis parameter denotes the value designated by the Hysteresis parameter (first Hysteresis parameter). $Threshold_1$ denotes the value designated by the u1-Threshold parameter.

When the entering condition of eventU1 is met, a timer set to a time (period) designated by the TTT parameter (e.g., first TTT parameter) may be started.

The eventU1 may be triggered when the timer set to the time (period) designated by the TTT parameter (e.g., first TTT parameter) expires after the entering condition of eventU1 is met. Specifically, a UL addition procedure for the corresponding UL carrier may be initiated.

If the leaving condition of eventU1 is met after the entering condition of eventU1 is met and before the timer set to the time (period) designated by the TTT parameter (the first TTT parameter) expires, eventU1 is not triggered. In this case, the timer set to the time (period) designated by the TTT parameter (first TTT parameter) may be reset.

As the event for the UL addition request, eventU1 has been used as an example, but embodiments are not limited thereto.

Further, the UL addition request configuration parameters (e.g., ulAddReqConfig) may further include an RACH indicator parameter.

The UL release request configuration parameters (e.g., ulRelReqConfig) may include parameters for the UL carrier release event (eventU2).

The UL release request configuration parameters (e.g., ulRelReqConfig) may include a u2-Threshold parameter, a Hysteresis parameter, and/or a TTT parameter.

The u2-Threshold parameter may designate a threshold for an estimated pathloss for triggering eventU2.

The Hysteresis parameter is a parameter used for the entering condition and leaving condition of eventU2. The Hysteresis parameter in the UL release request configuration parameter may be referred to as a second Hysteresis parameter. The entering condition of eventU2 may be referred to as a UL release event entering condition, and the leaving condition of eventU2 may be referred to as a UL release event leaving condition. The value of the second Hysteresis parameter for UL release may be the same as or different from the value of the first Hysteresis parameter for UL addition.

The TTT parameter may designate the time that should be met for eventU2 to be triggered. The TTT parameter in the UL release request configuration parameters may be referred to as a second TTT parameter. The value of the second TTT parameter for UL release may be the same as or different from the value of the first TTT parameter for UL addition.

The entering condition of eventU2 (e.g., the UL release event entering condition) may be as shown in Equation (8) below.

$$PL-Hysteresis<Threshold_2 \qquad (8)$$

Here, PL denotes the estimated pathloss (e.g., $\widehat{PL}_i$). Hysteresis denotes the value designated by the Hysteresis parameter (second Hysteresis parameter). Threshold denotes the value designated by the u2-Threshold parameter.

The leaving condition of eventU2 may be as shown in Equation (9) below.

$$PL+Hysteresis>Threshold_2 \qquad (9)$$

Here, PL denotes the estimated pathloss (e.g., $\widehat{PL}_i$). Hysteresis denotes the value designated by the Hysteresis parameter (second Hysteresis parameter). Threshold denotes the value designated by the u1-Threshold parameter.

When the entering condition of eventU2 is met, a timer set to a time (period) designated by the TTT parameter (second TTT parameter) may be started.

The eventU2 may be triggered when the timer set to the time (period) designated by the TTT parameter (second TTT parameter) expires after the entering condition of eventU2 is met. Specifically, a UL release procedure for the corresponding UL carrier may be initiated.

If the leaving condition of eventU2 is met after the entering condition of eventU2 is met and before the timer set to the time (period) designated by the TTT parameter (the second TTT parameter) expires, eventU2 is not triggered. In this case, the timer set to the time (period) designated by the TTT parameter (second TTT parameter) may be reset.

As the event for the UL release request, eventU2 has been used as an example, but embodiments are not limited thereto.

Further, the UL release request configuration parameter (e.g., ulRelReqConfig) may further include an RACH indicator parameter.

Further, the RRC message for AI model setup may further include quantity configuration information (e.g., Quantity-Config).

Table 4 shows an example of the quantity configuration information (e.g., QuantityConfig).

ence). The UE 301 may perform periodic UL inference according to the period set by the inference interval parameter, but embodiments are not limited thereto.

Through the AI-based UL inference, the UE 301 may obtain/estimate pathloss data for the base UL carrier. Further, the UE 301 may obtain pathloss data for UL carrier(s) other than the base UL carrier based on the pathloss data for the base UL carrier and the value of the UL carrier offset parameter. Here, the pathloss data may include a specific value or range of values for pathloss. The pathloss value obtained through AI-based UL inference (or estimation) has a more accurate value than the pathloss value estimated by simple DL measurement. Herein, the UL pathloss data inferred/estimated based on the AI model may be denoted as AI-inferred UL pathloss data, AI-inferred pathloss data, AI-estimated pathloss data or estimated pathloss data.

Pathloss data may be used to determine whether the UL addition condition or the UL release condition is met. Equation (4) (or Equation (6)/(7)) may be used to, for example, determine whether the UL addition condition is met. To determine whether the UL release condition is met, Equation (5) (or Equation (8)/(9)) may be used, for example.

The pathloss data may be used to determine power for UL transmission (UL transmission power) using the selected UL carrier. To determine the UL transmission power based on the pathloss data, Equation (1) or Equation (2) may be used, for example. In this case, the pathloss value $\widehat{PL}_i$ of the UL carrier may be used as the value $PL_{b,f,c}$ of Equation (1) or the value $PL_{b,f,c}(q_d)$ of Equation (2).

Examples of AI-based UL inference are described below with reference to FIGS. 4 to 6.

At 340 of FIG. 3, the UE 301 may perform a UL addition procedure. The UL addition procedure may be a conditional procedure. The UE 301 may determine whether the UL addition condition is met using the pathloss data obtained based on the AI-based UL inference and, when the UL addition condition is met, perform a procedure for adding a new UL carrier. Examples of the UL carrier addition procedure are described below with reference to FIGS. 7 to 9.

At 350, the UE 301 may perform a UL release procedure. The UL addition procedure may be a conditional procedure. The UE 301 may determine whether the UL release condition is met using the pathloss data obtained based on the AI-based UL inference and, when the UL release condition is met, perform a procedure for releasing an existing UL

TABLE 4

```
QuantityConfig ::=        SEQUENCE {
    quantityConfigNR-List     SEQUENCE (SIZE (1..maxNrOfQuanityConfig)) OF QuantityConfigNR
    ...,
    quantityConfigAI-UL       QuantityConfigAI-UL
}
QuantiyConfigAI-UL ::=    SEQUENCE {
    filterCoefficientAI-UL    FilerCoefficient    DEFAULT fc4,
}
```

Referring to Table 4, the quantity configuration information (e.g., QuantityConfig) may include a quantityConfigAI-UL parameter. The quantityConfigAI-UL parameter may be used to configure the measurement quantity and L3 filtering coefficient for AI-based inference.

The quantityConfigAI-UL parameter (or Quantity configuration information) may include a filterCoefficientAI-UL parameter. The filterCoefficientAI-UL parameter may designate the L3 filtering coefficient for AI UL.

Referring back to FIG. 3, at 330, the UE 301 may perform UL inference based on the AI model (AI-based UL infer-carrier. Examples of the UL carrier release procedure are described below with reference to FIGS. 10 and 11.

According to the method for multiple UL carrier access of the disclosure, it is possible to add/release one or more UL carriers using the exact pathloss data obtained/estimated through AI-based UL inference. In this case, a plurality of UL carriers may be configured. Thus, it is possible to support flexible UL Tx switching and select an appropriate UL carrier.

Further, according to the method for multiple UL carrier access, it is possible to perform accurate UL power control using the exact pathloss data obtained through AI-based UL inference. This may reduce UL interference and prevent unnecessary UE power consumption.

According to embodiments, some of the operations (or steps) shown in FIG. 3 may be omitted or additional operations may be included. For example, when the UL addition condition is not met, the UL addition procedure of 340 may not be performed. When the UL release condition is not met, the UL release procedure of 350 may not be performed. Further, the operations (or steps) may be performed in an order different from the order shown.

Figure 4:
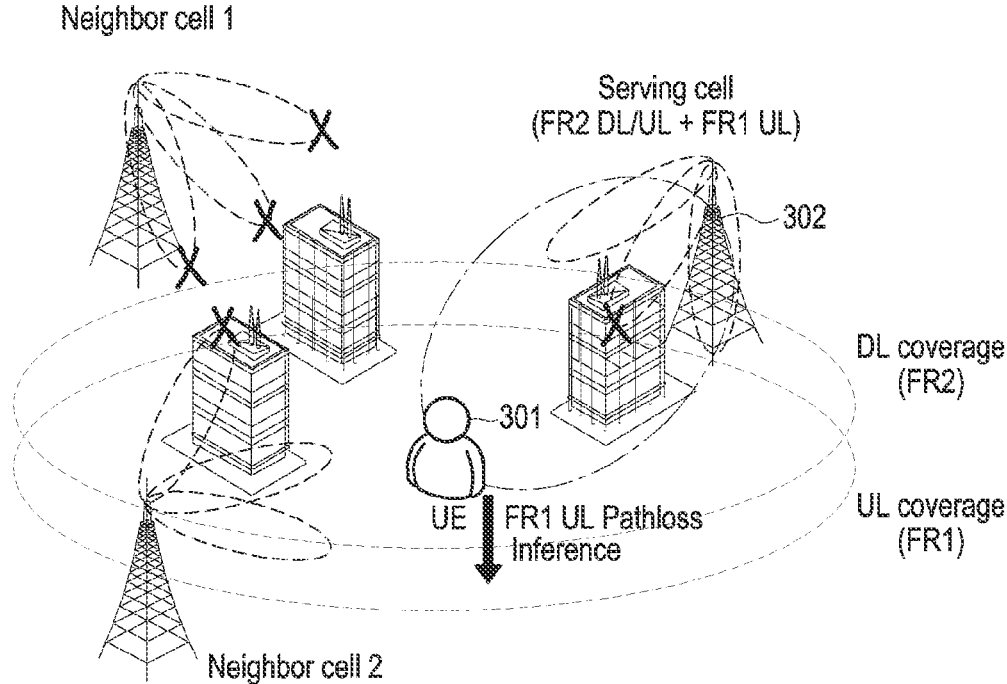
FIG. 4 is a diagram illustrating a scenario for AI-based UL inference according to an embodiment.

FIG. 4 is a diagram illustrating a scenario for AI-based UL inference, according to an embodiment.

In the case of FIG. 4, the UE 301 may receive DL signals from the BS (a serving cell) 302 and at least one neighbor cell (e.g., neighbor cell ½). The serving cell 302 may use the FR2 band for DL/UL and may use the FR1 band for UL (e.g., SUL), but is not limited thereto. As shown, some of the received DL signals may be blocked by blockage.

Referring to FIG. 4, the UE 301 may infer the pathloss for the base UL carrier (e.g., a UL carrier using the FR1 band) using the AI model. The input of the AI model used for pathloss inference for the base UL carrier may include not only the DL RSRP data (e.g., DL SS-RSRP data) of the serving cell, but also the DL RSRP data (e.g., DL SS-RSRP data) of the neighbor cell(s). Accurate pathloss data may be obtained through this AI-based inference. Thus, flexible UL Tx switching and UL transmission power control may be performed.

Figure 5:
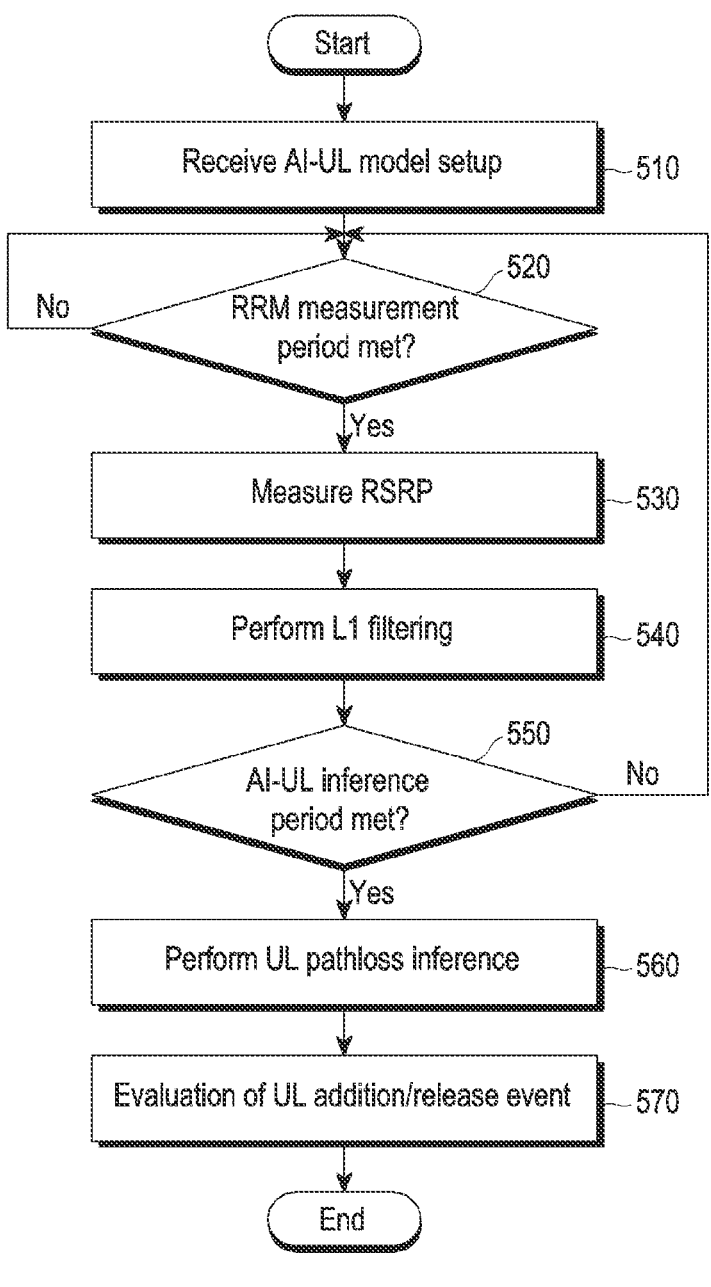
FIG. 5 is a flowchart illustrating a procedure for performing AI-based UL inference by a UE, according to an embodiment.

FIG. 5 is a flowchart illustrating a procedure for performing AI-based UL inference by a UE, according to an embodiment.

The AI-based UL inference procedure of FIG. 5 may be an example of 330 of FIG. 3.

Referring to FIG. 5, a procedure for performing AI-based UL inference (AI-based UL inference procedure) may include some or all of the following operations or steps.

At 510, the UE may receive AI model setup information from the base station. The AI model setup information of 510 of FIG. 5 may be the same as the AI model setup information of 320 of FIG. 3.

At 520, the UE may determine whether a radio resource management (RRM) measurement period is met. When the RRM measurement period is not met, the determination may be performed again at 520.

When the RRM measurement period is met, the UE may measure DL RSRP, at 530. For example, the UE may measure the beam-level DL SS-RSRP based on the SSB (or the reference signal included in the SSB). The UE may also measure DL RSRP based on another reference signal (e.g., CSI-RS).

At 540, the UE may perform filtering (e.g., L1 filtering) on DL RSRP measurement data. This filtering operation may be optional.

At 550, the UE may determine whether the UL inference period is met. The UE may determine whether the UL inference period is met based on the value of the Inference interval parameter. When the UL reasoning period is not met, the determination may be performed again at 520.

When the UL reasoning period is met, the UE may perform UL pathloss inference (AI-based UL inference) based on the DL RSRP measurement data (or filtered DL RSRP measurement data), at 560. The UE may infer (or estimate) the pathloss for the UL carrier using the pre-trained AI model. The AI model may be configured by the AI model setup information. The UE may obtain pathloss data for the base UL carrier using the pre-trained AI model based on the DL RSRP measurement data (or filtered DL RSRP measurement data) and obtain pathloss data for the base UL carrier and pathloss data for other UL carriers using the value of the UL carrier offset parameter. In this case, the DL RSRP measurement data (or filtered DL RSRP measurement data) may be used as an input of the AI model.

At 570, the UE may perform evaluation on the UL addition event and/or UL release event. The UE may determine whether the UL addition event meets a preset condition (UL addition condition) and/or whether the UL release event meets a preset condition (UL release condition) based on the inferred pathloss data. Thus, the UL addition event and/or the UL release event is triggered, so that a UL addition procedure and a UL release procedure may be performed.

Some of the operations shown in FIG. 5 may be omitted or additional operations may be included. For example, 540 may be omitted as an optional operation. 510 may be a separate operation performed before the AI-based UL inference procedure, and 520 may be a separate operation performed after the AI-based UL inference procedure. Further, the operations may be performed in an order different from the order shown.

Figure 6:
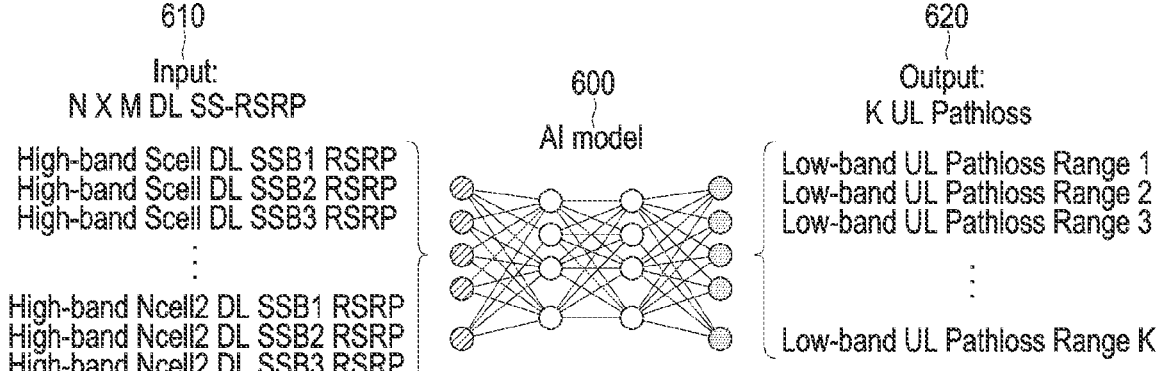
FIG. 6 is a diagram illustrating an AI model for AI-based UL inference, according to an embodiment.

FIG. 6 is a diagram illustrating an AI model for AI-based UL inference, according to an embodiment.

The AI model of FIG. 6 shows an example of an AI model using DL RSRP measurement data (e.g., beam level SS-RSRP measurement data) as an input. Referring to FIG. 6, an AI model 600 may receive N*M-sized DL SS-RSRP measurement data as an input 610. For example, in the case of having the arrangement structure of FIG. 4, the DL SS-RSRP data may include, but is not limited to, DL SS-RSRP measurement values for SSB1 to SSBn of the serving cell, DL SS-RSRP measurement values for SSB1 to SSBm of neighbor cell 1 (NCell1), and/or DL SS-RSRP measurement values for SSB1 to SSBl of neighbor cell 2 (NCell2).

The AI model 600 may generate probability values for K low-band UL pathloss ranges for the base UL carrier as an output 620.

The UE may determine that the low-band UL pathloss range having the highest probability value among the probability values included in the output 620 is the pathloss range of the base UL carrier corresponding to the corresponding input. Further, the UE may determine a pathloss range for a UL carrier other than the base UL carrier, using the UL carrier offset parameter.

As described above, in the example of FIG. 6, for convenience of description, DL SS-RSRP measurement data is used as an input of the AI model, but embodiments are not limited thereto. For example, DL RSRP measurement data measured based on other reference signals (e.g., CSI-RS) may also be used as an input of the AI model. For example, location information about the UE (e.g., GPS-based location data (GPS data)) may be used as an input of the AI model. For example, a combination of the DL RSRP data (e.g., DL SS-RSRP or DL RSRP data based on another reference signal) and location information about the UE may be used as an input of the AI model.

Further, in FIG. 6, it is described that pathloss ranges are used as output labels of the AI model, but embodiments are not limited thereto. For example, specific pathloss values may be used as output labels.

Figure 7:
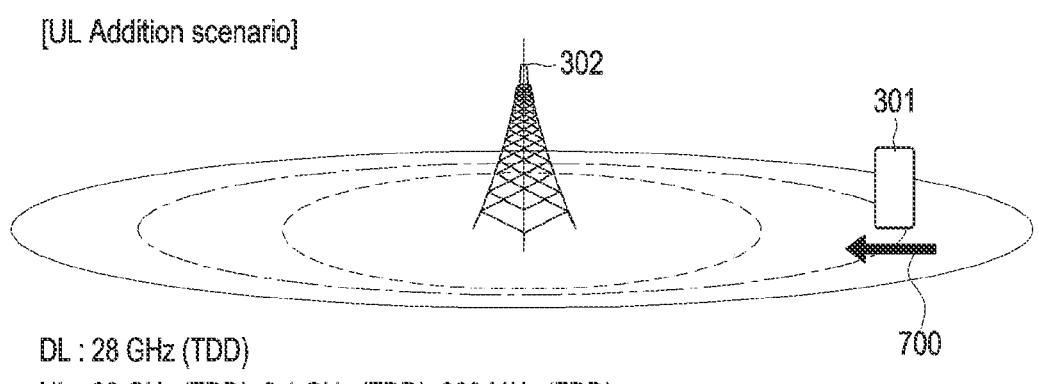
FIG. 7 is a diagram illustrating a scenario for UL carrier addition, according to an embodiment.

FIG. 7 is a diagram illustrating a scenario for UL carrier addition, according to an embodiment.

In FIG. 7, for convenience of description, it is assumed that three UL carriers are used. For example, as shown, a UL carrier using a 28 GHz band (UL carrier 1), a UL carrier using a 2.1 GHz band (UL carrier 2), and a UL carrier using an 800 MHz band (UL carrier 3) may be used. Among them, one UL carrier may be used as a base UL carrier. For example, UL carrier 3 having the widest coverage may be set as the base UL carrier.

As shown in FIG. 7, when the UE 301 moves closer 700 to the BS 302, an event for adding a UL carrier (event U1) may meet a preset condition (UL addition condition). For example, when the UE 301, located outside the UL coverage of UL carrier 2, moves within the UL coverage of UL carrier 2, an event for adding UL carrier 2 may meet a preset condition. Equation (4) (or Equation (6)/(7)) may be used to, for example, determine whether the UL addition condition is met. In this case, the value of pathloss data for UL carrier 2 may be obtained by adding the value of the UL carrier offset for UL carrier 2 set by the UL carrier offset parameter to the pathloss data value for UL carrier 3, which is the base UL carrier obtained using the AI model.

When the UL addition condition is met (i.e., when the UL addition event (event U1) is triggered), the UE 301 and the BS 302 may perform a procedure for adding a new UL carrier.

Figure 8:
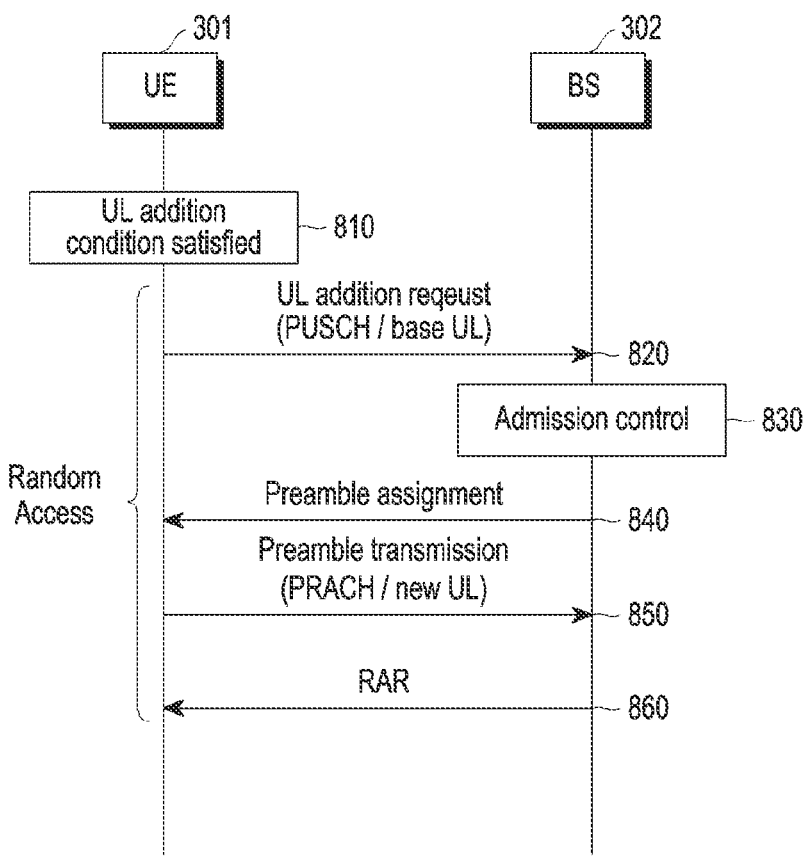
FIG. 8 is a diagram illustrating a procedure for UL carrier addition, according to an embodiment.

FIG. 8 is a diagram illustrating a procedure for UL carrier addition, according to an embodiment.

The UL carrier addition procedure of FIG. 8 may be an example of 340 of FIG. 3. The UL carrier addition procedure of FIG. 8 may be a UL carrier addition procedure operating as CFRA. In FIG. 8, CFRA may be performed after transmission of a UL addition request message using the base UL carrier of the UE.

Referring to FIG. 8, at 810, the UE 301 may identify that the UL addition condition is met. For example, the UE 301 may identify that the UL addition condition of Equation (4) is met. Alternatively, when the UL addition event entering condition of Equation (6) is met, and a preset period (e.g., the period set by the TTT parameter) elapses, the UE 301 may identify that the UL addition condition is met.

At 820, the UE 301 may transmit a UL addition request message to the BS 302. The UE 301 may transmit a UL addition request message using the base UL carrier. For example, the UE 301 may transmit a UL addition request message through the PUSCH using the base UL carrier.

The UL addition request message may include UL carrier index information about an addition event (event U1), AI-based UL inferred (AI-inferred) UL pathloss information, and/or PUSCH transmission power information.

Here, the UL carrier index information about the addition event may include the index of a UL carrier to be added when the UL addition condition is met.

The AI-inferred UL pathloss information may include an AI-inferred/estimated UL pathloss value (e.g., a UL pathloss range value) for the base UL carrier (or a UL carrier to be added). When the AI-inferred/estimated UL pathloss value for the base UL carrier is transferred to the base station 302, the BS 302 may obtain/calculate the AI-inferred/estimated UL pathloss value for the corresponding UL carrier using the UL carrier offset parameter value for the corresponding UL carrier.

The PUSCH transmission power information may include the transmission power value of the PUSCH through which the UL addition request is transmitted.

At 830, the BS 302 may perform admission control on the UL carrier to be added. Through admission control, the BS 302 may determine whether the UL carrier to be added may receive the corresponding UE.

At 840, the BS 302 may transmit a preamble assignment message. The BS 302 may transmit a preamble assignment message through the PDSCH. The preamble assignment message is an RRC message and may serve as a UL addition command for the UL addition request message.

The preamble assignment message may include information for assigning a preamble to be transmitted on a new UL carrier.

The preamble assignment message may optionally further include transmit power control (TPC) information for MSG1 (MSG1_PRACH) for random access. The TPC information for MSG1 may include a power correction value obtained based on a comparison between PUSCH-related power information and AI-inferred UL pathloss information in the UL addition request message. The PUSCH-related power information may be a value corresponding to a difference between the PUSCH reception power measured by the base station 302 (e.g., the reception power of the PUSCH including the UL addition request message) and the PUSCH transmission power in the UL addition request message.

The preamble assignment message may optionally further include RACH configuration information about the new UL carrier. In this case, system information block 1 (SIB1) broadcasted by the base station may include only RACH configuration information about the base UL carrier. RACH configuration information about the remaining UL carriers other than the base UL carrier may be included in the preamble assignment message for the corresponding UL carrier and transmitted. Thus, the overhead of SIB1 may be reduced. Instead, SIB1 may include RACH configuration information about all the UL carriers. In this case, the preamble assignment message does not include RACH configuration information about the new UL carrier. The RACH configuration information may include, for example, the number of SSBs per RACH occasion for the UL carrier and the number of preambles per SSB.

At 840, the UE 301 may transmit a preamble (MSG1) to the BS 302. The UE 301 may transmit a preamble using a new UL carrier. For example, the UE 301 may transmit a preamble through PRACH using the new UL carrier.

At 850, the BS 302 may transmit a random access response (RAR)(MSG2) to the UE 301. The BS 302 may transmit the RAR through the PDSCH, at 860.

The RAR may include a timing advance (TA) command and/or a training data collection indicator of the new UL carrier. The training data collection indicator may also be referred to as a data request indicator. The training data collection indicator or data request indicator may be set to a first value (e.g., 1) indicating a request (data request) for training data (sample) or a second value (e.g., 0) not indicating a request (data request) for training data (sample).

Figure 9:
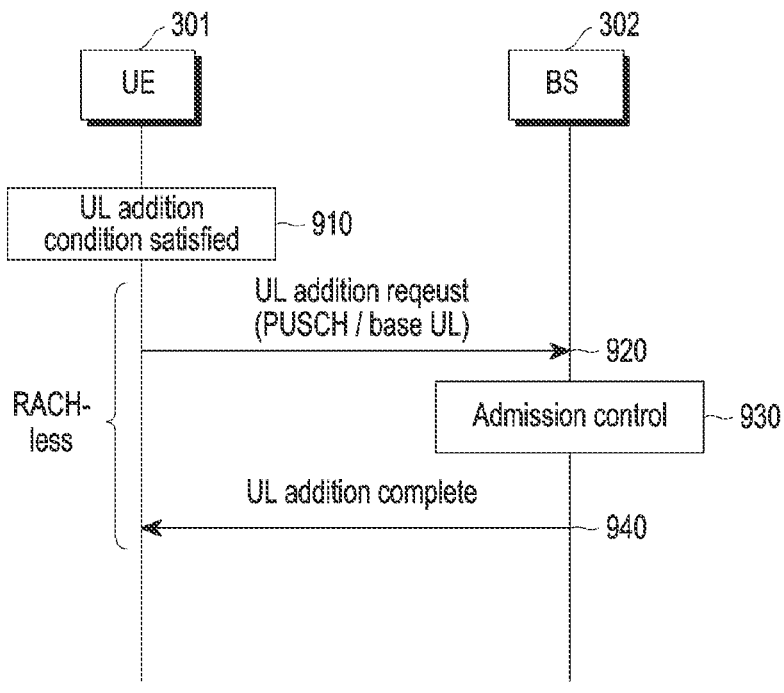
FIG. 9 is a diagram illustrating a procedure for UL carrier addition, according to an embodiment.

FIG. 9 is a diagram illustrating a procedure for UL carrier addition, according to an embodiment.

The UL carrier addition procedure of FIG. 9 may be an example of 340 of FIG. 3. The UL carrier addition procedure of FIG. 9 may be a UL carrier addition procedure operating as RACH-less.

Referring to FIG. 9, at 910, the UE 301 may identify that the UL addition condition is met. For example, the UE 301 may identify that the UL addition condition of Equation (4) is met. Alternatively, when the UL addition event entering condition of Equation (6) is met, and a preset period (e.g., the period set by the timeToTrigger parameter) elapses, the UE 301 may identify that the UL addition condition is met.

At 920, the UE 301 may transmit a UL addition request message to the BS 302. The UE 301 may transmit a UL addition request message using the base UL carrier. For example, the UE 301 may transmit a UL addition request message through the PUSCH using the base UL carrier.

For example, the UE 301 may transmit a UL addition request message for UL addition to the BS 302 through an RRC message. The UL addition request message may include UL carrier index information about an addition event (event U1), AI-based UL inferred (AI-inferred) UL pathloss information, and/or PUSCH transmission power information. For a description of each piece of information, reference may be made to the description of FIG. 8.

As another example, the UE 301 may transmit a UL carrier activation request for UL carrier activation to the BS 302 through a MAC CE. For example, when a previously configured UL carrier between the UE 301 and the BS 302 meets an addition event (event U1), the UE 302 may transmit a UL carrier activation request to the BS 302 using the MAC CE instead of an RRC message.

At 930, the BS 302 may perform admission control on the UL carrier to be added. Through admission control, the BS 302 may determine whether the UL carrier to be added may receive the corresponding UE.

At 940, the BS 302 may transmit a message indicating that the addition of the UL carrier is complete (UL addition complete message) to the UE 301.

Figure 10:
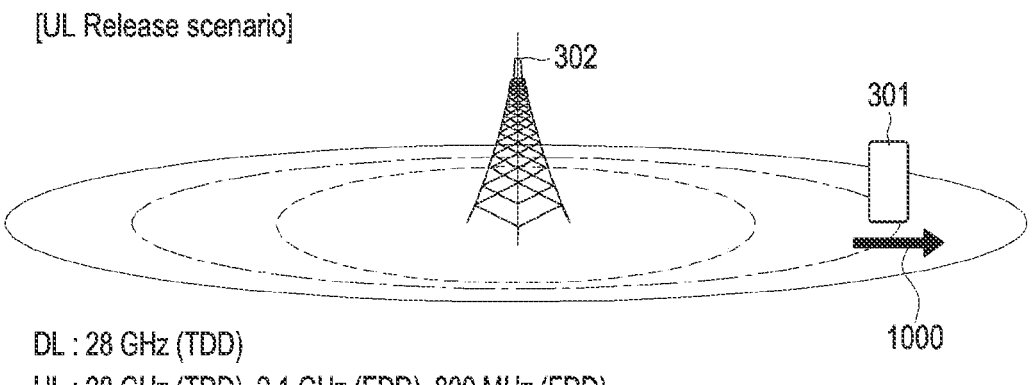
FIG. 10 is a diagram illustrating a scenario for UL carrier release, according to an embodiment.

FIG. 10 is a diagram illustrating a scenario for UL carrier release, according to an embodiment.

In FIG. 10, for convenience of description, it is assumed that three UL carriers are used. For example, as shown, a UL carrier (UL carrier 1) using a 28 GHz band, a UL carrier (UL carrier 2) using a 2.1 GHz band, and a UL carrier (UL carrier 3) using an 800 MHz band may be used. Among them, one UL carrier may be used as a base UL carrier. For example, UL carrier 3 having the widest coverage may be set as the base UL carrier.

As shown in FIG. 10, when the UE 301 moves away 1000 from the BS 302, an event for releasing a UL carrier (event U2) may meet a preset condition (UL release condition). For example, when the UE 301 located within the UL coverage of UL carrier 2 moves out of the UL coverage of UL carrier 2, the event for releasing UL carrier 2 may meet the preset condition. To determine whether the UL release condition is met, Equation (5) (or Equation (8)/(9)) may be used, for example. In this case, the value of pathloss data for UL carrier 2 may be obtained by adding the UL carrier offset for UL carrier 2 set by the UL carrier offset parameter to the pathloss data value for UL carrier 3 which is the base UL carrier obtained using the AI model.

When the UL release condition is met (i.e., when the UL release event (event U2) is triggered), the UE 301 and the BS 302 may perform a procedure for releasing an existing UL carrier.

Figure 11:
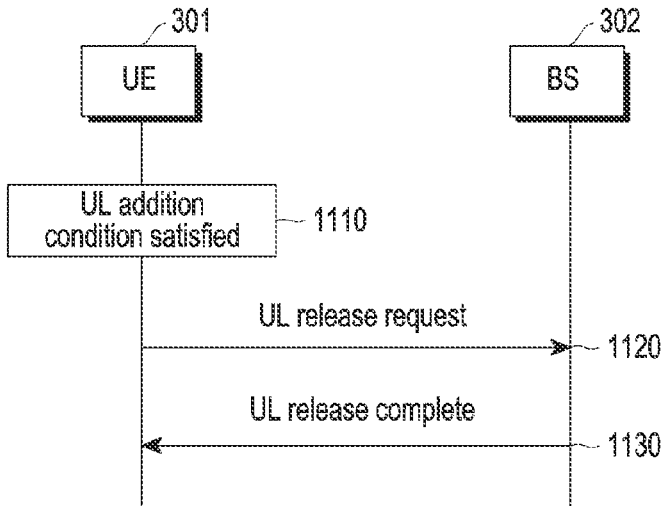
FIG. 11 is a diagram illustrating a procedure for UL carrier release, according to an embodiment.

FIG. 11 is a diagram illustrating a procedure for UL carrier release, according to an embodiment.

The UL carrier release procedure of FIG. 11 may be an example of 350 of FIG. 3.

Referring to FIG. 11, at 1110, the UE 301 may identify that the UL release condition is met. For example, the UE 301 may identify that the UL release condition of Equation (5) is met. Alternatively, when the UL release event entering condition of Equation (8) is met, and a preset period (e.g., the period set by the TTT parameter) elapses, the UE 301 may identify that the UL release condition is met.

At 1120, the UE 301 may transmit a UL release request message to the BS 302. The UE 301 may transmit a UL release request message using the base UL carrier. For example, the UE 301 may transmit a UL release request message through the PUSCH using the base UL carrier.

At 1130, the BS 302 may transmit a message indicating that the release of the UL carrier is complete (UL addition complete message) to the UE 301.

Figure 12:
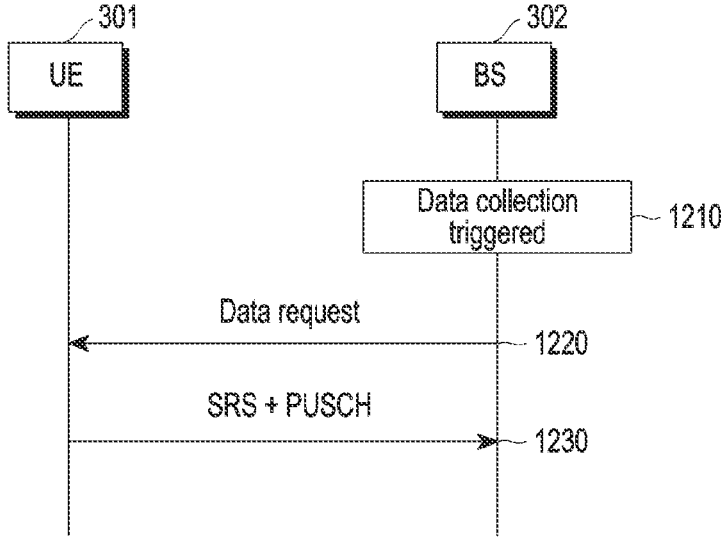
FIG. 12 is a diagram illustrating a data collection procedure for training an AI model, according to an embodiment.

FIG. 12 is a diagram illustrating a data collection procedure for training an AI model, according to an embodiment.

The embodiment of FIG. 12 shows an example of periodic (or random) training data collection. The training data collection procedure of FIG. 12 may be suitable for collecting data for initial AI model training. The initial training of the AI model may be performed by the base station or a server connected to the base station, but is not limited thereto.

Referring to FIG. 12, at 1210, the BS 302 may identify that data collection (or data collection event) is triggered. The BS 302 may identify that data collection (or data collection event) is triggered when a preset condition (e.g., periodic condition) is met.

At 1220, the BS 302 may transmit a data request message to the UE 301. The BS 302 may select a UE to request for data when it is identified that data collection (or data collection event) is triggered. The BS 302 may select all the UEs or some randomly selected UEs as UEs to request for data.

At 1230, the UE 301 may transmit a reference signal and a PUSCH to the BS 302. The reference signal may be a sounding reference signal (SRS), but embodiments are not limited thereto. Hereinafter, for convenience of description, it is assumed that the reference signal is the SRS.

The PUSCH may include data (e.g., DL RSRP measurement data (e.g., DL SS-RSRP measurement data) or UE location data (e.g., GPS data)) to be used as an input (X data) of an AI model to be trained.

The SRS may be used by the base station 302 to estimate UL pathloss. The UL pathloss estimated based on the SRS may be used as an output (Y label/actual value) for training the AI model. For example, the AI model may be trained to reduce the difference (error) between the UL pathloss (actual value) estimated based on the SRS and the AI-based UL inferred (AI-inferred) UL pathloss (inferred value) based on the input (X data). The configuration information for the so trained AI model may be transmitted to the UE 301 through the above-described AI model setup information (e.g., the AI model setup information of 320 in FIG. 3).

Figure 13:
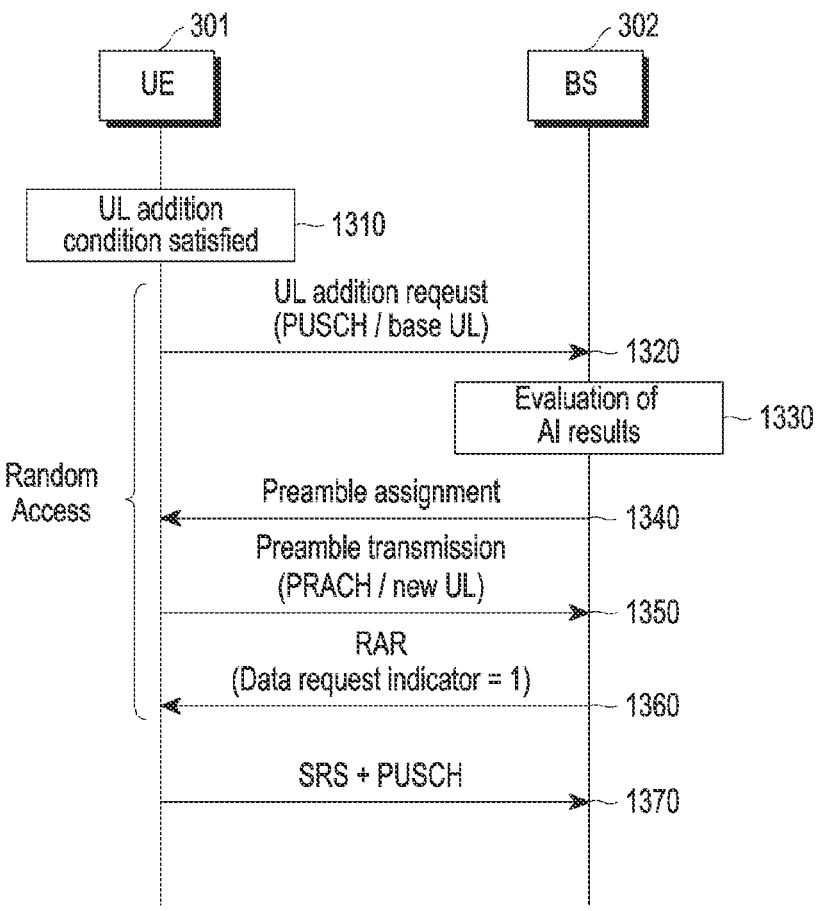
FIG. 13 is a diagram illustrating a data collection procedure for training an AI model, according to an embodiment.

FIG. 13 is a diagram illustrating another example of a data collection procedure for training an AI model, according to an embodiment.

FIG. 13 shows an example of threshold-based training data collection. The training data collection procedure of FIG. 13 may be suitable for collecting additional data for fine-tuning of the AI model that is running. The fine tuning of the AI model may be performed by the BS or a server connected to the BS, but is not limited thereto.

Referring to FIG. 13, at 1310, the UE 301 may identify that the UL addition condition is met. For example, the UE 301 may identify that the UL addition condition of Equation (4) is met. Alternatively, when the UL addition event entering condition of Equation (6) is met, and a preset period (e.g., the period set by the TTT parameter) elapses, the UE 301 may identify that the UL addition condition is met.

At 1320, the UE 301 may transmit a UL addition request message to the BS 302. The UL addition request message of 1320 may be identical to the UL addition request message of 820 of FIG. 8.

At 1330, the BS 302 may perform evaluation of AI results. For example, the BS 302 may determine whether the result of comparison between PUSCH-related power information and AI-inferred UL pathloss information (e.g., pathloss range value) in the UL addition request message is equal to or larger than a threshold. Here, the PUSCH-related power information may be a value corresponding to a difference between the PUSCH reception power measured by the BS 302 (e.g., the reception power of the PUSCH including the UL addition request message) and the PUSCH transmission power in the UL addition request message. When the result of comparison between the PUSCH-related power value and the AI-inferred UL pathloss value in the UL addition request message is larger than or equal to the threshold, the BS 302 may set the value of the training data collection indicator (data request indicator) in the RAR to the first value (e.g., 1) to indicate a request for training data. A description of the training data collection indicator (data request indicator) may refer to FIG. 8.

At 1340, the BS 302 may transmit a preamble assignment message. The preamble assignment message of 1340 of FIG. 13 may be identical to the preamble assignment message of 840 of FIG. 8.

At 1350, the UE 301 may transmit a preamble (MSG1) to the BS 302. The preamble of 1350 of FIG. 13 may be identical to the preamble of 840 of FIG. 8.

At 1360, the BS 302 may transmit an RAR (MSG2) to the UE 301. As described above, the RAR may include a training data collection indicator (data request indicator). The value of the training data collection indicator (data request indicator) may be set to the first value (e.g., 1) indicating a data request.

At 1370, the UE 301 may transmit a reference signal (e.g., SRS) and a PUSCH to the BS 302. For example, when the value of the training data collection indicator (data request indicator) in the RAR is set to the first value (e.g., 1) indicating a data request, the UE 301 may transmit the SRS and PUSCH to the BS 302.

The PUSCH may include data (e.g., DL RSRP measurement data (e.g., DL SS-RSRP measurement data) or UE location data (e.g., GPS data)) to be used as an input (X data) of an AI model to be trained.

The SRS may be used by the BS 302 to estimate UL pathloss. The UL pathloss estimated based on the SRS may be used as an output (Y label/actual value) for training the AI model. For example, the AI model may be trained to reduce the difference (error) between the UL pathloss (actual value) estimated based on the SRS and the AI-based UL inferred (AI-inferred) UL pathloss (inferred value) based on the input (X data). The configuration information for the so trained AI model may be transmitted to the UE 301 through the above-described AI model setup information (e.g., the AI model setup information of 320 in FIG. 3).

Figure 14:
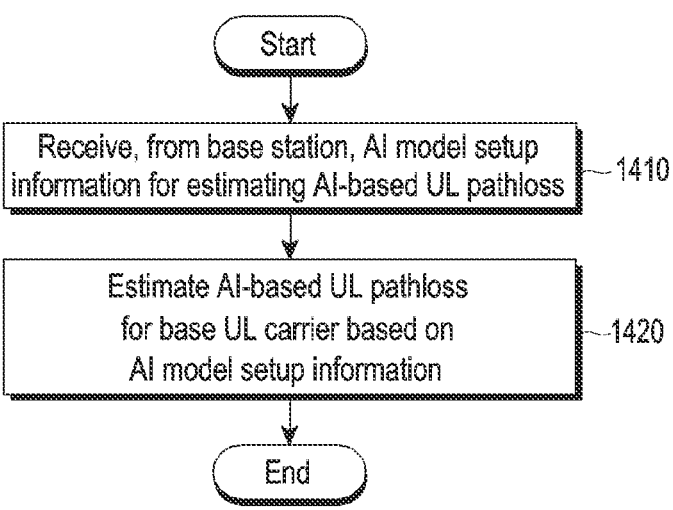
FIG. 14 is a flowchart illustrating a method by a UE, according to an embodiment.

FIG. 14 is a flowchart illustrating a method by a UE, according to an embodiment.

Referring to FIG. 14, the UE may receive AI model setup information (e.g., the AI model setup information of 320 in FIG. 3) for estimating AI-based UL pathloss from the BS, at 1410.

The UE may estimate AI-based UL pathloss for the base UL carrier based on the AI model setup information, at 1420.

The AI model setup information may include at least one of information on an AI model used for estimating the AI-based UL pathloss, period information for estimating the AI-based UL pathloss, offset information designating an offset between AI-based UL pathloss for the base UL carrier and AI-based UL pathloss for the corresponding UL carrier, information about a UL carrier addition event, or information about a UL carrier release event.

The AI model setup information may further include indicator information indicating whether UL carrier addition is operated as CFRA or RACH-less.

The AI model setup information may be transmitted through an RRC message.

The UE may determine whether a condition for adding a new UL carrier is met based on the AI-based UL pathloss and, when the condition for adding a new UL carrier is met, add the new UL carrier.

The UE may transmit a UL carrier addition request message for the new UL carrier to the base station, receive a preamble assignment message for assigning a preamble to be transmitted to the new UL carrier from the base station, transmit the preamble, and receive a random access response corresponding to the preamble.

The UL carrier addition request message may include UL carrier index information about a new UL carrier to be added, information about the AI-based UL pathloss, and transmission power information about the PUSCH where the UL carrier addition request message is transmitted.

The random access response may include indication information indicating whether to request training data to be used for training an AI model used for estimation of the AI-based UL pathloss. When the indication information is set to a value indicating to request the training data, the UE may transmit a SRS and a PUSCH to the base station.

The UE may determine whether a condition for releasing an existing UL carrier is met based on the AI-based UL pathloss.

The AI model used for estimation of the AI-based UL pathloss may use the DL RSRP measured based on the DL signal received from the serving cell and at least one neighbor cell or location data of the UE, as input data.

Figure 15:
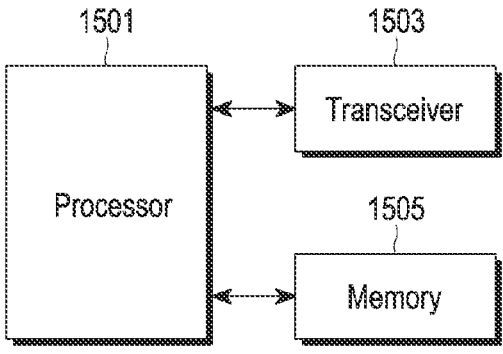
FIG. 15 is a diagram illustrating a configuration of a UE in a wireless communication system, according to an embodiment.

FIG. 15 is a diagram illustrating an example of a configuration of a UE in a wireless communication system, according to an embodiment.

In FIG. 15, a UE may include a processor 1501, a transceiver 1503, and a memory 1505. The processor 1501, transceiver 1503, and memory 1505 of the UE of FIG. 7 may be operated according to the method(s) described above in connection with FIGS. 1 to 14. However, the components of the UE are not limited thereto. For example, the UE may include more or fewer components than the above-described components. The processor 1501, the transceiver 1503, and the memory 1505 may be implemented in the form of at least one chip.

The transceiver 1503 collectively refers to a receiver and a transmitter and may transmit and receive signals to/from a UE or another network entity. The transmitted/received signals may include at least one of control information and data. To that end, the transceiver 1503 may include an RF transmitter for frequency-up converting and amplifying signals transmitted and an RF receiver for low-noise amplifying signals received and frequency-down converting the frequency of the received signals. This is merely an embodiment of the transceiver 510, and the components of the transceiver 1503 are not limited to the RF transmitter and the RF receiver. Further, the transceiver 1503 may receive signals through a communication scheme defined in the 3GPP standard, output the signals to the processor 1501, and transmit the signals output from the processor 1501. Further, the transceiver 1503 may receive the signal and output it to the processor 1501 and transmit the signal output from the processor 1501 to another network entity through the network.

The memory 1505 may store programs and data necessary for the operation of the UE according to at least one of the embodiments of FIGS. 1 to 14. The memory 1505 may store control information and/or data that is included in the signal obtained by the UE. The memory 1505 may include a storage medium, such as ROM, RAM, hard disk, CD-ROM, and DVD, or a combination of storage media.

The processor 1501 may control a series of processes so that the UE may operate according to at least one of the embodiments of FIGS. 1 to 14. The processor 1501 may include at least one processor.

Figure 16:
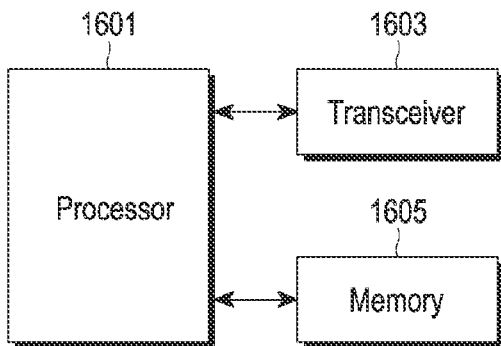
FIG. 16 is a diagram illustrating a configuration of a base station in a wireless communication system, according to an embodiment.

FIG. 16 is a diagram illustrating an example of a configuration of a BS in a wireless communication system, according to an embodiment.

In FIG. 16, a BS may include a processor 1601, a transceiver 1603, and a memory 1605. The processor 1601, transceiver 1603, and memory 1605 of the UE of FIG. 7 may be operated according to the method(s) described above in connection with FIGS. 1 to 14. However, the components of the BS are not limited thereto. For example, the BS may include more or fewer components than the above-described components. The processor 1601, the transceiver 1603, and the memory 1605 may be implemented in the form of at least one chip.

The transceiver 1603 collectively refers to a receiver and a transmitter and may transmit and receive signals to/from a UE or another network entity. The transmitted/received signals may include at least one of control information and data. To that end, the transceiver 1603 may include an RF transmitter for frequency-up converting and amplifying signals transmitted and an RF receiver for low-noise amplifying signals received and frequency-down converting the frequency of the received signals. This is merely an embodiment of the transceiver 1603, and the components of the transceiver 1603 are not limited to the RF transmitter and the RF receiver. Further, the transceiver 1603 may receive signals through a communication scheme defined in the 3GPP standard, output the signals to the processor 1601, and transmit the signals output from the processor 1601. Further, the transceiver 1603 may receive the signal and output it to the processor 1601 and transmit the signal output from the processor 1601 to another network entity through the network.

The memory 1605 may store programs and data necessary for the operation of the BS according to at least one of the embodiments of FIGS. 1 to 14. The memory 1605 may store control information and/or data that is included in the signal obtained by the UE. The memory 1505 may include a storage medium, such as ROM, RAM, hard disk, CD-ROM, and DVD, or a combination of storage media.

The processor 1601 may control a series of processes so that the base station may operate according to at least one of the embodiments of FIGS. 1 to 14. The processor 1601 may include at least one processor.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the present disclosure have been described above, various changes may be made thereto without departing from the scope of the present disclosure. Thus, the scope of the disclosure should not be limited to the above-described embodiments, and should rather be defined by the following claims and equivalents thereof.

What is claimed is:

1. A method performed by a user equipment (UE) in a wireless communication system, the method comprising:

receiving, from a base station, artificial intelligence (AI) model setup information for estimating AI-based uplink (UL) pathloss; and estimating the AI-based UL pathloss for a base UL carrier based on the AI model setup information, wherein the AI model setup information includes indicator information indicating whether UL carrier addition is operated as contention free random access (CFRA) or random access channel (RACH)-less, and at least one of:

information on an AI model used to estimate the AI-based UL pathloss, period information for estimating the AI-based UL pathloss, offset information related to an offset between the AI-based UL pathloss for the base UL carrier and the AI-based UL pathloss for a corresponding UL carrier, information on a UL carrier addition event, or information on a UL carrier release event.

2. The method of claim 1, wherein the AI model setup information is received via a radio resource control (RRC) message.

3. The method of claim 1, further comprising:

determining whether a condition for adding a new UL carrier is met based on the AI-based UL pathloss; and in case that the condition for adding the new UL carrier is met, adding the new UL carrier.

4. The method of claim 3, wherein adding the new UL carrier comprises:

transmitting, to the base station, a UL carrier addition request message for the new UL carrier;

receiving, from the base station, a preamble assignment message for assigning a preamble associated with the new UL carrier;

transmitting, to the base station, the preamble associated with the new UL carrier; and receiving, from the base station, a random access response corresponding to the preamble.

5. The method of claim 4, wherein the UL carrier addition request message includes at least one of:

UL carrier index information on the new UL carrier to be added, information on the AI-based UL pathloss, and transmission power information for a physical uplink shared channel (PUSCH) where the UL carrier addition request message is transmitted.

6. The method of claim 4, wherein the random access response includes indication information indicating whether to request training data to be used for training an AI model used to estimate the AI-based UL pathloss, and wherein the method further comprises, in case that the indication information is set to a value indicating to request the training data, transmitting a sounding reference signal (SRS) and a PUSCH to the base station.

7. The method of claim 1, further comprising determining whether a condition for releasing an existing UL carrier is met based on the AI-based UL pathloss.

8. The method of claim 1, wherein an AI model used to estimate the AI-based UL pathloss uses, as input data, downlink (DL) reference signal received power (RSRP) measurement data measured based on a DL signal received from a serving cell and at least one neighbor cell or location data of the UE.

9. A user equipment (UE) in a wireless communication system, comprising:

a memory; and a processor connected to the memory, the processor configured to:

receive, from a base station, artificial intelligence (AI) model setup information for estimating AI-based uplink (UL) pathloss, and estimate the AI-based UL pathloss for a base UL carrier based on the AI model setup information, wherein the AI model setup information includes indicator information indicating whether UL carrier addition is operated as contention free random access (CFRA) or random access channel (RACH)-less, and at least one of:

information on an AI model used to estimate the AI-based UL pathloss, period information for estimating the AI-based UL pathloss, offset information related to an offset between the AI-based UL pathloss for the base UL carrier and the AI-based UL pathloss for a corresponding UL carrier, information on a UL carrier addition event, or information on a UL carrier release event.

10. The UE of claim 9, wherein the AI model setup information is received via a radio resource control (RRC) message.

11. The UE of claim 9, wherein the processor is further configured to:

determine whether a condition for adding a new UL carrier is met based on the AI-based UL pathloss, and in case that the condition for adding the new UL carrier is met, add the new UL carrier.

12. The UE of claim 11, wherein the processor is further configured to:

transmit, to the base station, a UL carrier addition request message for the new UL carrier to the base station, receive, from the base station, a preamble assignment message for assigning a preamble associated with the new UL carrier, transmit, to the base station, the preamble associated with the new UL carrier, and receive, from the base station, a random access response corresponding to the preamble.

13. The UE of claim 12, wherein the UL carrier addition request message includes at least one of:

UL carrier index information on the new UL carrier to be added, information on the AI-based UL pathloss, and transmission power information for a physical uplink shared channel (PUSCH) where the UL carrier addition request message is transmitted.

14. The UE of claim 12, wherein the random access response includes indication information indicating whether to request training data to be used for training an AI model used to estimate the AI-based UL pathloss, and wherein the processor is configured to, in case that the indication information is set to a value indicating to request the training data, transmit a sounding reference signal (SRS) and a PUSCH to the base station.

15. The UE of claim 9, wherein the processor is further configured to determine whether a condition for releasing an existing UL carrier is met based on the AI-based UL pathloss.

16. The UE of claim 9, wherein an AI model used to estimate the AI-based UL pathloss uses, as input data, downlink (DL) reference signal received power (RSRP) measurement data measured based on a DL signal received from a serving cell and at least one neighbor cell or location data of the UE.

* * * * *